J. E. DOWNER.
JOURNAL FOR CAR WHEELS.
APPLICATION FILED AUG. 23, 1918.

1,309,467.

Patented July 8, 1919.

Inventor
Joseph E. Downer

By Victor J. Evans
Attorney

UNITED STATES PATENT OFFICE.

JOSEPH E. DOWNER, OF ALLENPORT, PENNSYLVANIA.

JOURNAL FOR CAR-WHEELS.

1,309,467. Specification of Letters Patent. Patented July 8, 1919.

Application filed August 23, 1918. Serial No. 251,169.

*To all whom it may concern:*

Be it known that I, JOSEPH E. DOWNER, a citizen of the United States, residing at Allenport, in the county of Washington and State of Pennsylvania, have invented new and useful Improvements in Journals for Car-Wheels, of which the following is a specification.

This invention relates to a device for prolonging the life of a car wheel and has for its primary object to provide a device of simple substantial construction that may be readily arranged in place for compensating for wear between the wheel hub and axle thereof.

An object of the invention is to provide a device effectively held against displacement in any direction.

With these and other objects in view the invention will be better understood from the following detailed description taken in connection with the accompanying drawing wherein.

Figure 1:
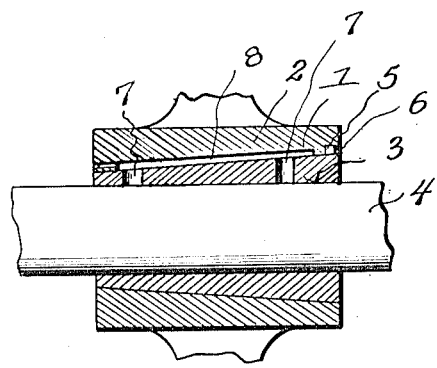
Figure 1 is a sectional view of the invention.
Figure 2:
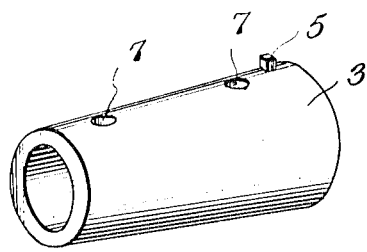
Fig. 2 is a perspective view of the journal.

My invention in one of its forms as illustrated in the drawing consists of providing a tapering bore 1 in the wheel hub 2. The numeral 3 designates the journal having a shape corresponding to and engaging the wall of the bore 1 thereby creating a wedging action between the journal and hub 2 for preventing any accidental displacement thereof in the use of the wheel. For the purpose of preventing the turning of the journal 3 within the hub 2 due to the rotation of the shaft 4 I provide a lug 5 on the journal detachably engaging a recess 6 in the hub.

From the foregoing description taken in connection with the accompanying drawing it will be apparent that I provide a device of substantial construction which may be readily removed when worn a predetermined degree and a new one replaced thereby prolonging the life of the wheel proper. It is to be understood that if a new wheel is to be manufactured it is to be formed with a tapering bore 1, but I wish it to be understood that wheels now in use that have been rendered useless due to the wearing of the bore of the hub may be drilled to have a tapering shape so as to coöperate with my improved form of journal. It is of course to be understood that the invention may be constructed in various other manners than illustrated; therefore I do not desire to be limited in any manner except as set forth in the claim hereto appended.

Having described my invention, what I claim is:

In combination a wheel hub having a tapering bore and an oil recess, a tapering bushing provided with a bearing surface and having a wedging connection with said bore, a lug engaging the depression in the hub and openings connecting said recess with the bearing surface.

In testimony whereof I affix my signature.

JOSEPH E. DOWNER.